(12) United States Patent
van Wijk et al.

(10) Patent No.: US 10,233,716 B2
(45) Date of Patent: Mar. 19, 2019

(54) BLOWOUT PREVENTER INCLUDING BLIND SEAL ASSEMBLY

(71) Applicants: Cameron International Corporation, Houston, TX (US); Shell Oil Company, Houston, TX (US)

(72) Inventors: Johannes van Wijk, GS Rijswijk (NL); Melvyn F. Whitby, Houston, TX (US)

(73) Assignees: Cameron International Corporation, Houston, TX (US); Shell Oil Company, Houston, TX (US)

( * ) Notice: Subject to any disclaimer, the term of this patent is extended or adjusted under 35 U.S.C. 154(b) by 238 days.

(21) Appl. No.: 14/979,288

(22) Filed: Dec. 22, 2015

(65) Prior Publication Data

US 2017/0058628 A1    Mar. 2, 2017

Related U.S. Application Data (60) Provisional application No. 62/212,691, filed on Sep. 1, 2015.

(51) Int. Cl.
*E21B 33/06* (2006.01)
*F16K 3/314* (2006.01)
*E21B 29/08* (2006.01)

(52) U.S. Cl.
CPC ............ *E21B 33/063* (2013.01); *E21B 29/08* (2013.01); *F16K 3/314* (2013.01)

(58) Field of Classification Search
CPC ........ E21B 33/063; E21B 29/08; E21B 33/06; E21B 33/061; E21B 33/062

USPC .................................... 251/1.1–1.3; 137/317
See application file for complete search history.

(56) References Cited

U.S. PATENT DOCUMENTS

| | | | |
|---|---|---|---|
| 5,360,061 A | 11/1994 | Womble | |
| 5,931,442 A | 8/1999 | Commins | |
| 6,173,770 B1 * | 1/2001 | Morrill | E21B 33/063 166/55 |
| 6,296,225 B1 | 10/2001 | Watts | |
| 6,719,042 B2 * | 4/2004 | Johnson | E21B 33/063 166/297 |
| 7,234,530 B2 * | 6/2007 | Gass | E21B 33/063 166/376 |

(Continued)

OTHER PUBLICATIONS

International Search Report and Written Opinion of PCT Application No. PCT/US2015/067536 dated May 2, 2016: pp. 1-15.

(Continued)

*Primary Examiner* — Ian G Paquette
(74) *Attorney, Agent, or Firm* — Helene Raybaud (57) ABSTRACT

A ram blowout preventer ("BOP") may be used for sealing about an object positioned in a vertical bore extending through the BOP. The ram BOP includes a body comprising a vertical bore extending through the body and a ram cavity intersecting the bore, a ram assembly movable laterally into and out of the BOP vertical bore and comprising a ram body, and an opposing ram assembly movable laterally into and out of the BOP vertical bore and comprising a ram body and a seal body coupled to the ram body, wherein the seal body comprises a seal configured to seal the entirety of the BOP vertical bore. The seal can be located on the upper and/or lower portion of the seal body to provide for bi-directional sealing across the BOP.

18 Claims, 6 Drawing Sheets

(56) References Cited

U.S. PATENT DOCUMENTS

| | | | | |
|---|---|---|---|---|
| 7,552,765 B2* | 6/2009 | Lam | ............... | E21B 33/062 |
| | | | | 166/55 |
| 7,721,401 B2* | 5/2010 | Huff | ............... | E21B 33/062 |
| | | | | 29/402.09 |
| 8,740,174 B2* | 6/2014 | Juda | ............... | E21B 33/062 |
| | | | | 251/1.1 |
| 9,428,984 B2* | 8/2016 | Dhuet | ............ | E21B 33/076 |
| 2012/0000647 A1 | 1/2012 | Springett et al. | | |
| 2012/0067563 A1* | 3/2012 | Jellison | ............ | E21B 17/042 |
| | | | | 166/85.4 |
| 2013/0153204 A1* | 6/2013 | Carbaugh | ........ | E21B 33/063 |
| | | | | 166/55 |
| 2013/0168075 A1 | 7/2013 | Shah et al. | | |
| 2014/0000902 A1 | 1/2014 | Wolfe et al. | | |
| 2014/0290949 A1* | 10/2014 | Hall | ............... | E21B 33/063 |
| | | | | 166/298 |

OTHER PUBLICATIONS

International Preliminary Report on Patentability for the equivalent International patent application PCT/US2015/067536 dated Mar. 15, 2018.

\* cited by examiner

BLOWOUT PREVENTER INCLUDING BLIND SEAL ASSEMBLY

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Blowout preventers ("BOPs") are used extensively throughout the oil and gas industry. Typical BOPs are used as a large specialized valve or similar mechanical device that seal, control, and monitor oil and gas wells. The two categories of BOPs that are most prevalent are ram BOPs and annular BOPs. BOP stacks frequently utilize both types of BOPs, typically with at least one annular BOP stacked above several ram BOPs. The ram units in ram BOPs allow for shearing drill pipe in the case of shear rams, sealing off around drill pipe in the case of pipe rams, and sealing the BOP bore in the case of blind rams. Typically, a BOP stack may be secured to a wellhead and may provide a safe means for sealing the well in the event of a system failure.

An example BOP includes a main body or housing with a vertical bore. Ram bonnet assemblies may be bolted to opposing sides of the main body using a number of high tensile fasteners, such as bolts or studs. These fasteners are required to hold the bonnet in position to enable the sealing arrangements to work effectively. An elastomeric sealing element may be used between the ram bonnet and the main body. There are several configurations, but essentially they are all directed to preventing a leakage bypass between the mating faces of the ram bonnet and the main body.

Each bonnet assembly includes a piston which is laterally movable within a ram cavity of the bonnet assembly by pressurized hydraulic fluid acting on the piston. The opposite side of each piston has a connecting rod attached thereto which in turn has a ram mounted thereon for extension into the vertical bore. The rams can be shear rams for shearing an object within the bore of a BOP. Alternatively, the rams can be pipe rams for sealing off around an object within the bore of a BOP, such as a pipe, thereby sealing the annular space between the object and the BOP bore. In addition, the rams can be blind rams for sealing the BOP bore.

The rams are designed to move laterally toward the vertical bore of the BOP to shear or seal off on any object located therein. For instance, opposing shear rams utilize cutting surfaces configured to close in on and shear an object located in the BOP bore, such as a section of drill pipe used during drilling operations. The opposing shear rams can include seals disposed adjacent the cutting faces of the shear rams and configured to come together to seal off the BOP bore. Placement of the seals near the cutting faces of shear rams weakens the cutting or shearing strength of the shear rams.

Pipe rams utilize seals that close in on and seal off on a tubular within the vertical bore of the BOP. Each pipe ram typically has a semicircular opening in its front face to form a seal about half of the outer periphery of the object within the BOP vertical bore. When the opposing pipe rams are closed, the opposing pipe rams engage each other and seal the entire periphery of the object, thereby closing off the annulus between the object and the BOP bore. Typical pipe ram assemblies can include a ram packer which is composed of an elastomeric or rubber material configured to seal off against the tubular within the vertical bore of the BOP when the opposing rams are run into the closed position.

Still further, blind rams utilize seals that close in and seal on opposing blind ram seals to seal off a BOP bore when no object is present in the bore.

As discussed above, a single BOP stack can include an annular BOP, one or more sets of shear rams, one or more sets of pipe rams, and one or more sets of blind rams. Each respective set of rams is located above or below each adjacent set of rams. In this way, a BOP stack increases in height and weight with the addition of each set of rams. It is desirable to minimize the height and weight of a BOP stack to reduce complexity, costs, and equipment footprint.

Further, many existing BOP rams are constructed of a material which, while suitable for cutting or shearing purposes, is not NACE International compliant. That is, the rams and in particular the sealing features of the rams do not meet the requisite corrosion control standards.

Moreover, and as discussed above, placement of seals or packers adjacent the cutting edge of a shear ram can affect the shear ram cutting or shearing strength.

Accordingly, shear, blind, and pipe rams including sealing features that are NACE compliant are desirable. Furthermore, shear, blind, and pipe rams which do not unnecessarily add to the height and weight of a BOP stack are desirable. Still further, a shear ram with sealing capability but with uncompromised cutting edges is desirable. In addition, a subsea drilling system capable of being pressure tested without having to pull the entire drilling riser is desirable.

DESCRIPTION OF THE DRAWINGS

For a detailed description of the preferred embodiments of the present disclosure, reference will now be made to the accompanying drawings in which.

DETAILED DESCRIPTION

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

BOPs may be included at a wellhead when drilling or completing a well to close off the well to prevent a blowout. Such a blowout might occur, for example, when the well intersects a pocket of fluid under high pressure, which then blows up through the well bore. A BOP closes to seal the well against the fluid pressure from below. A BOP can also be used to seal off the well around a pipe in the wellbore during drilling operations involving positive downhole pressure. In practice, multiple BOPs are arrayed in a vertical stack, which is positioned over the well, with the well piping or tubing extending up through the center of the BOP stack. BOPs can be used in conjunction with onshore and offshore drilling and completion operations.

Figure 1:
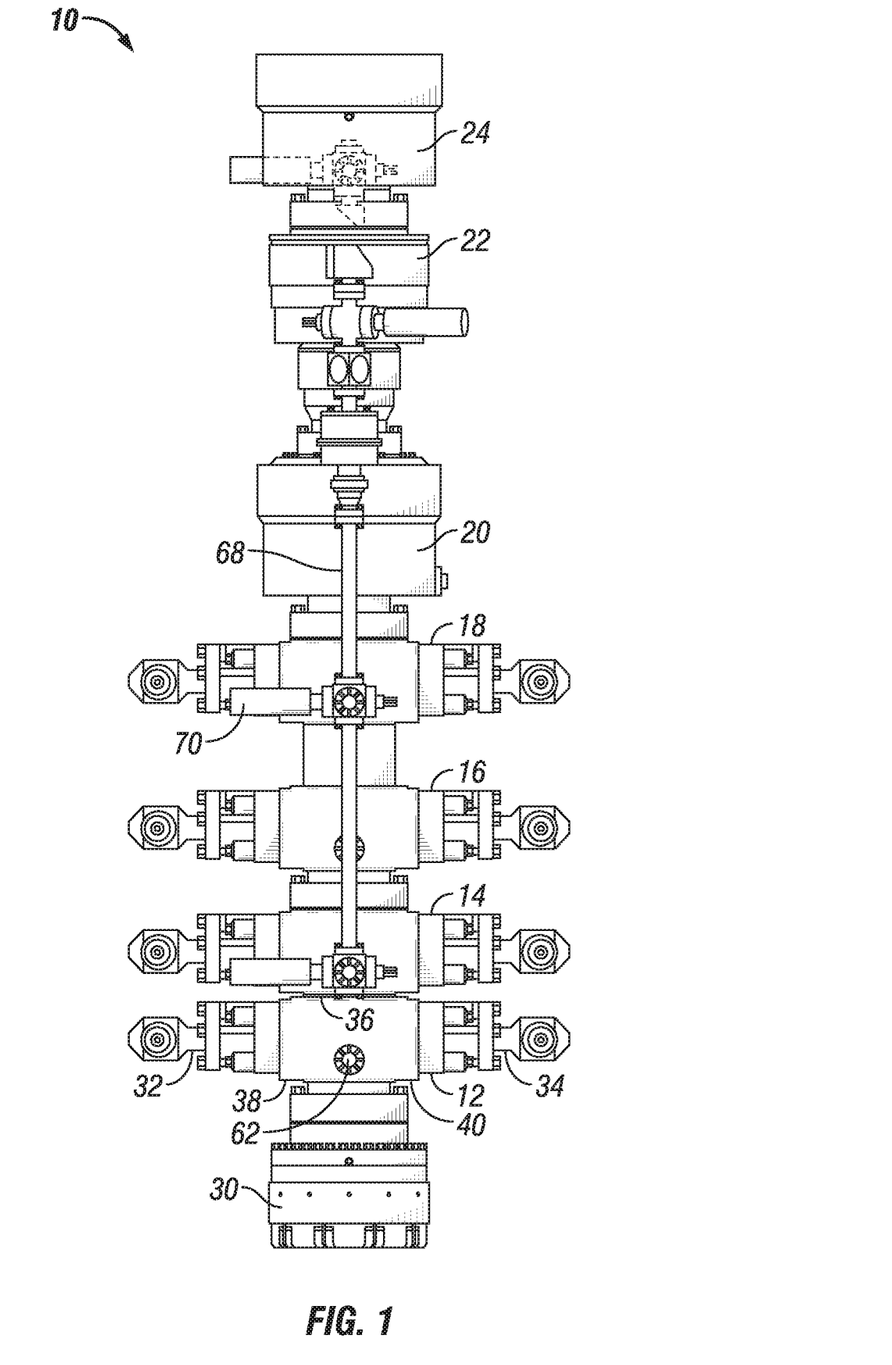
FIG. 1 shows a side elevation of a BOP stack.
Figure 2:
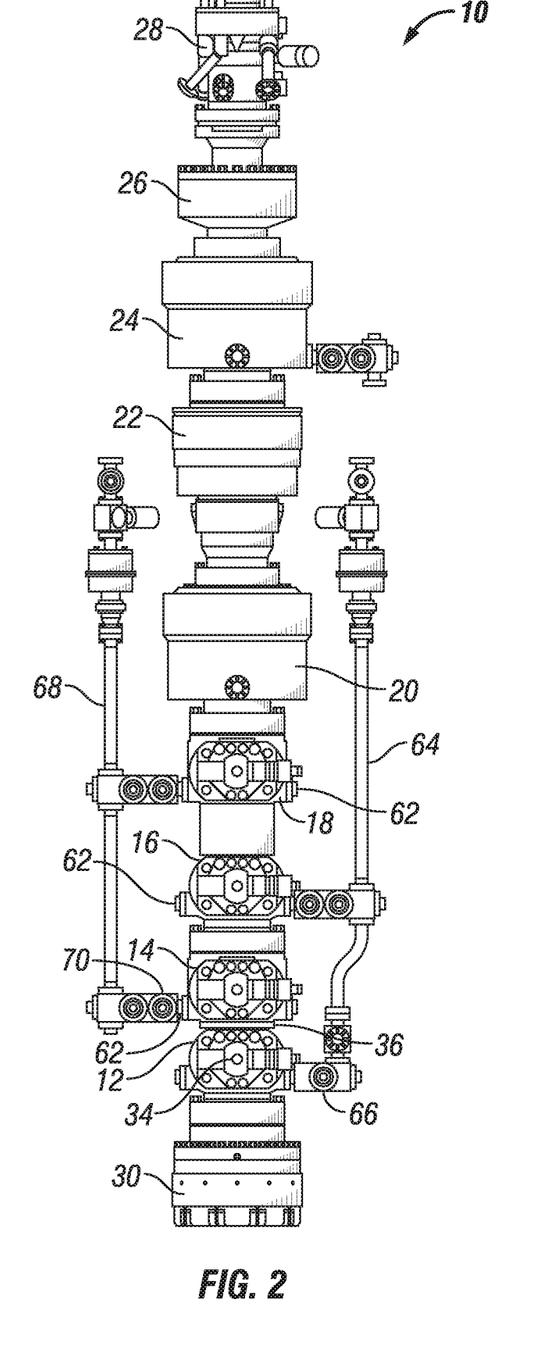
FIG. 2 shows another side elevation of the BOP stack of FIG. 1.

FIGS. 1 and 2 provide two views of a BOP stack shown generally at 10. Various hydraulic lines, framework and control apparatus for operating the BOP stack 10 are not shown for purposes of clarity. The stack 10 includes four ram-type BOPs 12, 14, 16, and 18. The ram-type BOPs 12-18 can comprise pipe rams, blind rams, shear rams, etc. An annular BOP 20, a connector 22, a second annular BOP 24 and a flex joint 26 are arrayed above the ram-type BOPs 12-18. A riser adapter 28 is positioned at the top of the stack 10 for connection to a marine riser above (not shown). A wellhead connector 30 is located at the bottom of the stack 10 for connection to a wellhead below (not shown). In general, the number and kind of BOPs in a stack, as well as the order in which they are arrayed in the stack, may vary.

A ram-type BOP includes a pair of linear drive devices, or linear actuators, located on opposite sides of a central BOP housing. The linear actuators provide lateral movement along a straight line, perpendicular to the vertical, toward and away from the housing. For example, a ram-type BOP such as shown at 12 provides a pair of piston and cylinder assemblies 32 and 34 with the cylinders fixed on opposite sides of a central housing 36 positioned over the well so that the pistons are movable along a line perpendicular to the vertical, that is, perpendicular to the well bore at the surface of the well. The piston and cylinder assemblies 32 and 34 are housed in cavities of bonnet assemblies disposed on either side of the BOP housing.

As shown, the bottom two BOPs 12 and 14 have a common, extended central housing 36. A central vertical bore through the housing 36 is aligned with the well bore so that well pipe extending from the well passes upwardly through the housing along its central bore. The pistons are hydraulically operated to simultaneously move toward each other, or away from each other. Each piston carries a ram at the piston end toward the well, so that the two rams meet in a closed position at the housing central bore when the pistons are driven together, and are pulled apart by the pistons to an open configuration. The central vertical bores through housings of the ram-type BOPs 12-18 form part of a central vertical passageway extending from the wellhead and the well bore below, up through all of the elements in the BOP stack 10 and on through the marine riser.

A cavity is provided within the central housing for each ram-type BOP 12-18, that is, for each pair of piston and cylinder combinations 32/34. Each cavity intersects the vertical bore of the housing 36 and extends radially outwardly toward the piston and cylinder structures 32 and 34 in two guideways 38 and 40, with each guideway interposed between the central housing and a corresponding piston and cylinder assembly. The ram carried by a piston resides and moves within the corresponding guideway can cavity.

The rams in a multiple BOP stack may operate in different ways in closing off the well. Pipe rams seal around a tubular pipe extending from the well, closing off the annulus between the well pipe and the well bore surface. Blind rams seal across the well with no pipe at the location of the blind ram. Shear, or cutting, rams shear the well pipe, but do not seal off the annulus around the pipe. Blind shear rams shear the well pipe and close and seal the well. A BOP with blind shear rams is typically at the top of a ram-type BOP stack, with various pipe rams in BOPs located below. In a typical application, the top ram-type BOP 18 would be fitted with blind shear rams, and the lower preventers 12-16 would contain pipe rams.

Figure 3:
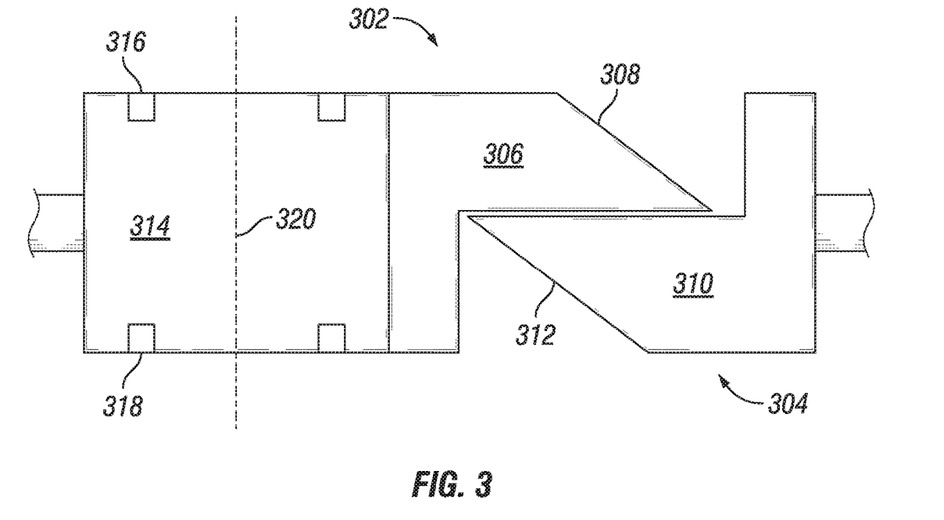
FIG. 3 shows a cross-sectional schematic view of BOP ram assemblies in engagement, in accordance with one or more embodiments.

Turning now to FIG. 3, a cross-sectional side elevation view of BOP ram assemblies 302 and 304 in engagement is shown for illustrative purposes. Ram assembly 302 includes a ram body 306 comprising an angled cutting face 308. Ram assembly 304 comprises a ram body 310 including an angled cutting face 312. Angled cutting faces 308 and 312, respectively, configured to shear an object located in the vertical bore of a BOP during shearing operations. The object can include drill pipe, drill joints, etc. As shown, cutting faces 308 and 312 come into shearing engagement when ram assemblies 302 and 304 are moved laterally together. The sheared object is withdrawn from the vertical bore of the BOP after shearing operations are completed.

Ram assembly 302 further includes a seal body 314. Seal body 314 is shown coupled to ram body 306. In this way, seal body 314 and ram body 306 may be constructed of different materials. For instance, ram body 306 may be constructed from one steel alloy, such as 4340 alloy steel, whereas seal body 314 may be constructed from another steel alloy, such as 4130 alloy steel. Importantly, seal body 314 comprises a material which meets NACE International compliance standards, such as NACE corrosion and sulfide stress cracking standards from NACE MR0175/ISO 15156. Ram body 306 can comprise a non-NACE compliant material which is harder and can better cope with increased shear forces during closing operations. In alternative embodiments, seal body 314 and ram body 306 can be constructed of the same material, i.e., be one integral piece, provided the appropriate NACE International compliance standards are considered.

Seal body 314 comprises an upper seal 316 and a lower seal 318, alternatively referred to as "blind seals". Upper seal 316 is located in an upper portion of seal body 314 and is configured to seal against an inner portion of a BOP, such as a ram cavity. Lower seal 318 is located in a lower portion of seal body 314 and is configured to seal against an inner portion of a BOP, such as a ram cavity. Upper seal 316 and lower seal 318 are generally circular in shape and share a longitudinal axis 320. In other embodiments, seal body 314 may comprise only an upper seal, such as upper seal 316, or only a lower seal, such as lower seal 318.

Initially, ram assembly 302 and ram assembly 304 are each in an open position laterally withdrawn from a vertical bore of a BOP. During shearing operations, ram assemblies 302 and 304 are moved laterally into the vertical bore to a closed position to shear an object located in the BOP vertical bore. The closed position is illustrated in FIG. 3. After shearing is complete, ram assembly 304 is moved laterally back to its initial position. In order to move ram assembly 304 back to its initial position, the ram actuator (i.e., piston and rod assembly for moving ram assembly 304) must be hydraulically vented. Hydraulic ventilation can be accomplished in a variety of ways, including providing relief valves on the actuation assembly. The relief valves may be pilot operated or automatically controlled by a controller, such as a MUX controller. Ram assembly 302 is also moved laterally toward ram assembly 304 such that at least a portion of ram assembly 302 as well as the ram assembly 304 reside in the same bonnet of the BOP. Ram assembly 304 can be moved to its initial position using hydraulic fluid or by pushing ram assembly 304 using ram assembly 302. Ram assembly 304 is movable to its initial position after being hydraulically vented, as discussed above. When moved laterally toward ram assembly 304, upper seal 316 and lower seal 318 of seal body 314 seal against interior surfaces of the BOP. In this way, upper seal 316 and lower seal 318 provide for bi-directional sealing across the BOP.

Moreover, by coupling seal body 314 to ram body 306, ram assembly 302 can provide both shear ram and blind ram functionality, thereby rendering another set of blind rams superfluous. As a result, the overall height of the BOP can be reduced because one less BOP is needed.

Figure 4:
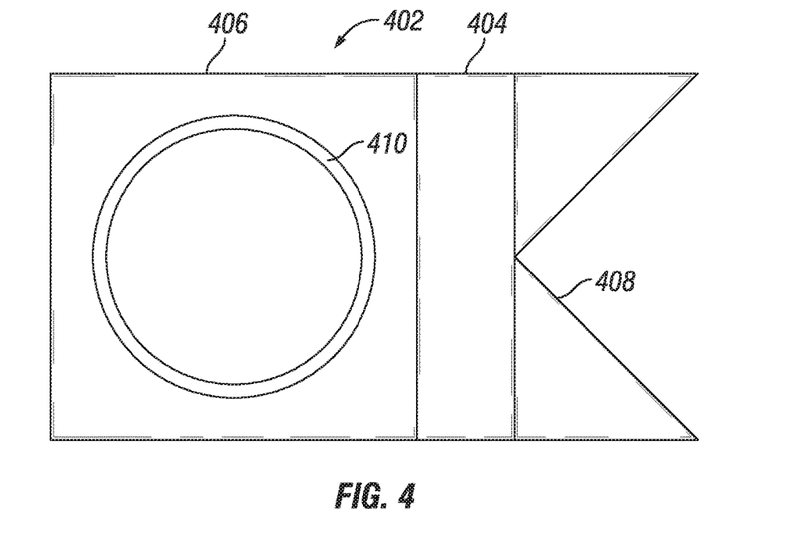
FIG. 4 shows a top schematic view of a BOP shear ram assembly, in accordance with one or more embodiments.

Turning now to FIG. 4, a top plan view of a shear ram assembly 402 including a ram body 404 and a seal body 406, in accordance with one or more embodiments, is shown. Ram body 404 includes a cutting or shearing surface 408. In the illustrated embodiment, the shearing surface 408 generally comprises a V-shape. However, other geometries and shapes are envisioned. As discussed above, shearing surface 408 is configured to move in on and shear an object located within a vertical bore of a BOP, together with an opposing shear ram assembly with a corresponding shearing surface.

Seal body 406 includes an upper seal 410 located on the upper surface of seal body 406. In the illustrated embodiment, the seal 410 is shown as having a circular profile. However, other profiles are envisioned, such as an ellipse. In addition, seal 410 can be centrally located on the upper surface of seal body 406, or can be offset from center. A lower seal is similarly located on the lower portion of seal body 406 but is not shown in this top view. When seal body 406 is moved into a bore of a BOP, upper seal 410 and the lower seal provide for bi-directional sealing across the BOP bore by sealing against interior surfaces of the blowout preventer housing, such as ram cavities disposed within the blowout preventer housing.

Figure 5:
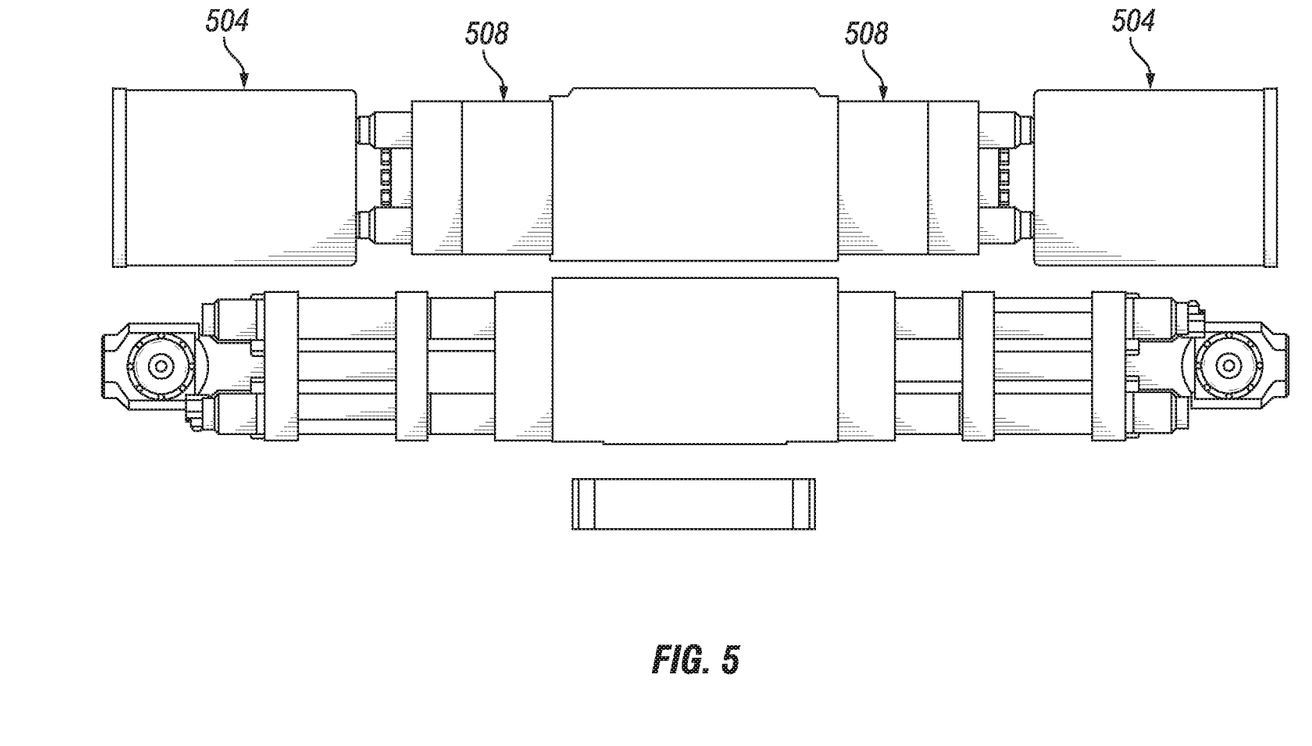
FIG. 5 shows a side elevation view of a shear ram BOP assembly, in accordance with one or more embodiments.

Turning now to FIG. 5, a side elevation view of a shear ram BOP assembly 502 including bonnets and a cavity extension, in accordance with one or more embodiments, is shown. BOP assembly 502 includes a sealing shear ram bonnet 504. Sealing shear ram bonnet 504 is configured to house a shear ram assembly comprising a seal body and seal(s), such as shear ram assembly 302 and seal body 314 discussed above and illustrated in FIG. 3. BOP assembly 502 also includes a shear ram bonnet 504 and bonnet extension 508 to house the short ram 304 and longer ram 302. BOP assembly 502 further includes a ram cavity extension 508 configured to accommodate the additional length of the shear ram assembly housed in bonnet 504 resulting from inclusion of the seal body.

Figure 6:
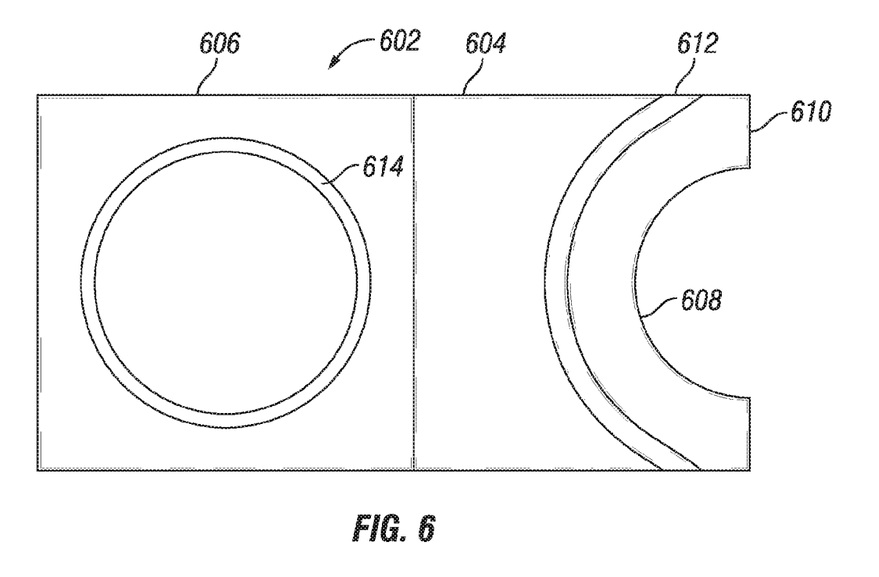
FIG. 6 shows a top schematic view of a BOP pipe ram assembly, in accordance with one or more embodiments.

Turning now to FIG. 6, a top plan view of a BOP pipe ram assembly 602 including a ram body 604 and a seal body 606, in accordance with one or more embodiments, is shown. Ram body 604 and seal body 606 can be constructed from a single piece of material. Alternatively, ram body 604 and seal body 606 can be constructed from different pieces of material. Ram body 604 is configured to close in on and seal off on an object, such as a drill pipe joint, a casing joint, or a tool joint, within the vertical bore of a BOP. Ram body 604 includes a semicircular opening 608 on its front face 610 which is configured to form a seal against about half of the outer periphery of the object within the BOP vertical bore.

When an opposing and corresponding pipe ram is moved laterally to a closed position together with ram body 604, the rams engage each other and seal the entire periphery of the object, thereby closing off the annulus between the object and the BOP bore. Typical pipe ram assemblies can include a ram packer 612 which is composed of an elastomeric or rubber material configured to seal off against the tubular within the vertical bore of the BOP when the opposing rams are run into the closed position.

Seal body 606 includes an upper seal 614 located on the upper surface of seal body 606. In the illustrated embodiment, the seal 614 is shown as having a circular profile. However, other profiles are envisioned, such as an ellipse. In addition, seal 614 can be centrally located on the upper surface of seal body 606, or can be offset from center. A lower seal is similarly located on the lower portion of seal body 606 but is not shown in this top view. When seal body 606 is moved into a bore of a BOP, upper seal 614 and the lower seal provide for bi-directional sealing across the BOP bore.

Moreover, by coupling seal body 606 to pipe ram body 604, ram assembly 602 can provide both pipe ram and blind ram functionality, thereby rendering another set of blind rams superfluous. As a result, the overall height of the BOP can be reduced because one less BOP is needed.

Figure 7:
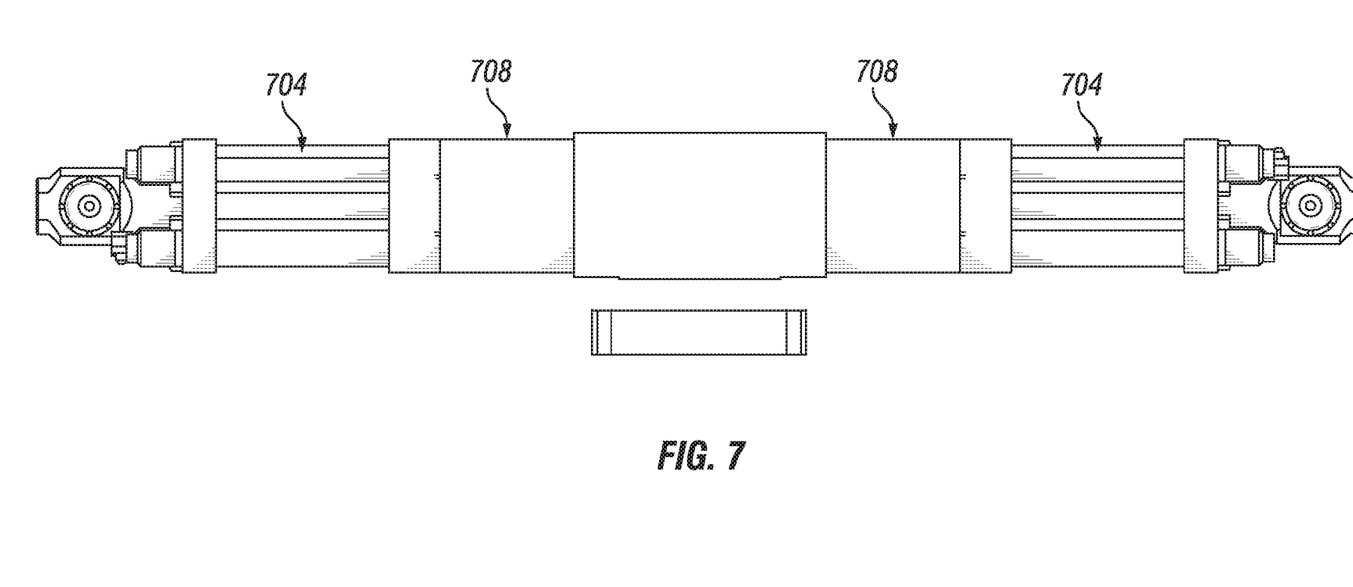
FIG. 7 shows a side elevation view of a pipe ram BOP assembly, in accordance with one or more embodiments.

Turning now to FIG. 7, a side elevation view of a pipe ram BOP assembly 702 including bonnets and a cavity extension, in accordance with one or more embodiments, is shown. BOP assembly 702 includes an extended bonnet 704. Extended bonnet 704 is configured to house a pipe ram assembly comprising a seal body and seal(s), such as pipe ram assembly 602 and seal body 606 discussed above and illustrated in FIG. 6. BOP 702 also includes another extended pipe ram bonnet 704 to house another pipe ram assembly which does not include a seal body, such as seal body 606. BOP assembly 702 further includes a ram cavity extension 708 configured to accommodate the additional length of the pipe ram assembly housed in bonnet 704 resulting from inclusion of the seal body.

The ram cavity extensions discussed in FIGS. 5 and 7 can be retrofitted to existing BOP bonnet assemblies. In this way, existing BOPs can be modified to accommodate the disclosed ram assemblies, including seal bodies with sealing elements. Further, the seal bodies and sealing elements can be retrofitted to existing ram assemblies. As such, the present disclosure allows for an existing BOP stack to be reduced in height and weight by retrofitting it with ram sets that are multi-functional (i.e., can provide blind ram functionality in addition to shearing ram, pipe ram, or blind ram functionality).

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The bi-directional blind function of ram body 602 allows pressure testing of all of the blind ram functions in assembly 10 (including sealing shear rams and other rams including assembly 402) when the work string is not in assembly 10 provided there are at least two rams with blind functionality. This functionality saves a significant amount of rig time in deep-water operations as no test tool has to be installed below ram preventer 40 to seal off the well bore and also does not require more prime rig time to validate any other well bore blind functions.

What is claimed is:

1. A blowout preventer ("BOP") assembly, comprising:
   a body comprising a vertical bore extending through the body and a ram cavity intersecting the bore;
   a ram assembly movable laterally into and out of the vertical bore and comprising a ram body; and
   an opposing ram assembly movable laterally into and out of the vertical bore and comprising a rain body and a seal body comprising a seal configured to seal the entirety of the vertical bore, and the ram bodies of the ram assembly and the opposing ram assembly comprise cutting faces configured to shear an object located in the vertical bore when the ram bodies of the ram assembly and the opposing ram assembly are moved laterally into the vertical bore
   wherein the seal comprises a first annular structure positioned at least in part on a top surface of the seal body, the seal body comprises another seal configured to seal the entirety of the vertical bore, the another seal comprises a second annular structure positioned at least in part on a bottom surface of the seal body opposite the top surface of the seal body, and the seal and the another seal are physically separate from one another.

2. The BOP assembly of claim 1, wherein the seal body is configured to be retrofitted to an existing opposing ram assembly ram body.

3. The BOP assembly of claim 1, wherein the seal is one piece.

4. The BOP assembly of claim 1, wherein the seal comprises a ring-shaped body.

5. The BOP assembly of claim 1, wherein the ram body of the opposing ram assembly is formed from a first material having a first hardness, and the seal body is formed from a second material having a second hardness less than the first hardness.

6. The BOP assembly of claim 1, wherein the opposing ram assembly comprises a cutting face, and the opposing ram assembly is devoid of seals adjacent to the cutting face.

7. The BOP assembly of claim 1, wherein the seal body is coupled to the ram body and is constructed from a different material than that of the ram assembly and opposing ram assembly ram bodies.

8. The BOP assembly of claim 7, wherein the seal body comprises an anti-corrosion material.

9. The BOP assembly of claim 1, wherein the seal is located on the top of the seal body.

10. The BOP assembly of claim 7, further comprising another seal located on the bottom of the seal body and configured to seal the vertical bore.

11. A blowout preventer ("BOP") assembly, comprising:
    a ram body formed from a first material having a first hardness;
    a seal body coupled to the ram body and formed from a second material having a second hardness less than the first hardness; and
    an actuator configured to drive the ram body and the seal body along a lateral axis into a vertical bore of the BOP;
    wherein the seal body is positioned between the ram body and the actuator along the lateral axis, the seal body supports a seal configured to seal the entirety of the vertical bore of the BOP; and
    wherein the seal comprises a first annular structure positioned at least in part on a top surface of the seal body, the seal body comprises another seal configured to seal the entirety of the vertical bore, the another seal comprises a second annular structure positioned at least in part on a bottom surface of the seal body opposite the top surface of the seal body, and the seal and the another seal are physically separate from one another.

12. The BOP assembly of claim 11, wherein the ram body comprises a shear ram configured to shear an object located in the vertical bore when closed together with an opposing shear ram.

13. The BOP assembly of claim 11, wherein the ram body comprises a pipe ram configured to close about an object located in the vertical bore when closed together with an opposing pipe ram.

14. The BOP assembly of claim 11, wherein the ram body comprises a blind ram configured to seal the vertical bore when closed together with an opposing blind ram.

15. The BOP assembly of claim 11, wherein the first material comprises a steel alloy and the second material comprises a different steel alloy.

16. The BOP assembly of claim 11, wherein the second material comprises an anti-corrosion material.

17. The BOP assembly of claim 11, wherein the seal is located on the top of the seal body.

18. The BOP assembly of claim 17, further comprising another seal located on the bottom of the seal body and configured to seal the entirety of the vertical bore.

* * * * *